(12) United States Patent
Wills et al.

(10) Patent No.: US 10,282,632 B1
(45) Date of Patent: *May 7, 2019

(54) SYSTEMS AND METHODS FOR DETERMINING A SAMPLE FRAME ORDER FOR ANALYZING A VIDEO

(71) Applicant: GOPRO, INC., San Mateo, CA (US)

(72) Inventors: Jonathan Wills, San Mateo, CA (US); Daniel Tse, San Mateo, CA (US); Desmond Chik, Mountain View, CA (US)

(73) Assignee: GoPro, Inc., San Mateo, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 15/272,070

(22) Filed: Sep. 21, 2016

(51) Int. Cl.
*G06K 9/46* (2006.01)
*G06K 9/00* (2006.01)
*G06T 7/00* (2017.01)

(52) U.S. Cl.
CPC ........... *G06K 9/46* (2013.01); *G06K 9/00744* (2013.01); *G06T 7/0022* (2013.01); *G06T 2207/10016* (2013.01)

(58) Field of Classification Search
CPC ........... G06K 9/00758; G06K 9/00718; G06K 9/00765
See application file for complete search history.

(56) References Cited

U.S. PATENT DOCUMENTS 6,633,685 B1 10/2003 Kusama
7,222,356 B1 5/2007 Yonezawa
7,296,231 B2 * 11/2007 Loui ................. G06F 17/30802
348/584
7,483,618 B1 1/2009 Edwards
7,512,886 B1 3/2009 Herberger
(Continued)

FOREIGN PATENT DOCUMENTS

JP H09181966 A 7/1997
JP 2005252459 A 9/2005
(Continued)

OTHER PUBLICATIONS

PCT International Search Report and Written Opinion for PCT/US2015/023680, dated Oct. 6, 2015, 13 pages.
(Continued)

*Primary Examiner* — Menatoallah Youssef
(74) *Attorney, Agent, or Firm* — Sheppard Mullin Richter & Hampton LLP

(57) ABSTRACT

A system and/or method configured to determine a sample frame order for analyzing a video. The video may have multiple frames ordered in a sequence from a beginning to an end. A first sample frame order for analyzing the video may be determined. Determining the first sample frame order may include determining an initial frame for a first iteration, and determining secondary frames for a second iteration. Determining the initial frame and the secondary frames may be based on a function of frame position in the sequence of frames. The initial frame may be associated with a first sample position, and the secondary frames may be associated with secondary sample positions in the sample frame order. A first feature of the video may be determined based on an analysis of the frames in the video performed on the frames in the first sample frame order.

20 Claims, 6 Drawing Sheets

(56) References Cited

U.S. PATENT DOCUMENTS

| | | |
|---|---|---|
| 7,885,426 B2 | 2/2011 | Golovchinsky |
| 7,970,240 B1 | 6/2011 | Chao |
| 8,180,161 B2 | 5/2012 | Haseyama |
| 8,396,878 B2 | 3/2013 | Acharya |
| 8,446,433 B1 | 5/2013 | Mallet |
| 8,606,073 B2 | 12/2013 | Woodman |
| 8,611,422 B1 | 12/2013 | Yagnik |
| 8,612,463 B2 | 12/2013 | Brdiczka |
| 8,718,447 B2 | 5/2014 | Yang |
| 8,763,023 B1 | 6/2014 | Goetz |
| 8,774,560 B2 | 7/2014 | Sugaya |
| 8,971,623 B2 | 3/2015 | Gatt |
| 8,990,328 B1 | 3/2015 | Grigsby |
| 9,041,727 B2 | 5/2015 | Ubillos |
| 9,077,956 B1 | 7/2015 | Morgan |
| 9,142,257 B2 | 9/2015 | Woodman |
| 9,253,533 B1 | 2/2016 | Morgan |
| 9,342,376 B2 | 5/2016 | Jain |
| 9,396,385 B2 | 7/2016 | Bentley |
| 9,418,283 B1 | 8/2016 | Natarajan |
| 2002/0165721 A1 | 11/2002 | Chang |
| 2004/0001706 A1 | 1/2004 | Jung |
| 2004/0128317 A1 | 7/2004 | Sull |
| 2005/0025454 A1 | 2/2005 | Nakamura |
| 2005/0108031 A1 | 5/2005 | Grosvenor |
| 2005/0198018 A1 | 9/2005 | Shibata |
| 2006/0080286 A1 | 4/2006 | Svendsen |
| 2006/0115108 A1 | 6/2006 | Rodriguez |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0183843 A1 | 7/2008 | Gavin |
| 2008/0253735 A1 | 10/2008 | Kuspa |
| 2008/0313541 A1 | 12/2008 | Shafton |
| 2009/0019995 A1 | 1/2009 | Miyajima |
| 2009/0125559 A1 | 5/2009 | Yoshino |
| 2009/0213270 A1 | 8/2009 | Ismert |
| 2009/0252474 A1 | 10/2009 | Nashida |
| 2010/0046842 A1 | 2/2010 | Conwell |
| 2010/0086216 A1 | 4/2010 | Lee |
| 2010/0104261 A1* | 4/2010 | Liu .............. G11B 27/034 386/241 |
| 2010/0183280 A1 | 7/2010 | Beauregard |
| 2010/0199182 A1 | 8/2010 | Lanza |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0274714 A1 | 10/2010 | Sims |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0318660 A1 | 12/2010 | Balsubramanian |
| 2011/0075990 A1 | 3/2011 | Eyer |
| 2011/0093798 A1 | 4/2011 | Shahraray |
| 2011/0103700 A1 | 5/2011 | Haseyama |
| 2011/0137156 A1 | 6/2011 | Razzaque |
| 2011/0170086 A1 | 7/2011 | Oouchida |
| 2011/0206351 A1 | 8/2011 | Givoly |
| 2011/0242098 A1 | 10/2011 | Tamaru |
| 2011/0293250 A1 | 12/2011 | Deever |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0141019 A1 | 6/2012 | Zhang |
| 2012/0210205 A1 | 8/2012 | Sherwood |
| 2012/0246114 A1 | 9/2012 | Edmiston |
| 2012/0283574 A1 | 11/2012 | Park |
| 2012/0311448 A1 | 12/2012 | Achour |
| 2013/0136193 A1 | 5/2013 | Hwang |
| 2013/0151970 A1 | 6/2013 | Achour |
| 2013/0166303 A1 | 6/2013 | Chang |
| 2013/0182166 A1 | 7/2013 | Shimokawa |
| 2013/0195429 A1 | 8/2013 | Fay |
| 2013/0197967 A1 | 8/2013 | Pinto |
| 2013/0208942 A1 | 8/2013 | Davis |
| 2013/0235071 A1 | 9/2013 | Ubillos |
| 2013/0239051 A1 | 9/2013 | Albouze |
| 2013/0259390 A1 | 10/2013 | Dunlop |
| 2013/0259399 A1 | 10/2013 | Ho |
| 2013/0282747 A1 | 10/2013 | Cheng |
| 2013/0283301 A1 | 10/2013 | Avedissian |
| 2013/0287214 A1 | 10/2013 | Resch |
| 2013/0300939 A1 | 11/2013 | Chou |
| 2013/0318443 A1 | 11/2013 | Bachman |
| 2013/0330019 A1 | 12/2013 | Kim |
| 2013/0343727 A1 | 12/2013 | Rav-Acha |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0149865 A1 | 5/2014 | Tanaka |
| 2014/0152762 A1 | 6/2014 | Ukil |
| 2014/0161351 A1 | 6/2014 | Yagnik |
| 2014/0165119 A1 | 6/2014 | Liu |
| 2014/0169766 A1 | 6/2014 | Yu |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0245336 A1 | 8/2014 | Lewis, II |
| 2014/0282661 A1 | 9/2014 | Martin |
| 2014/0300644 A1 | 10/2014 | Gillard |
| 2014/0328570 A1 | 11/2014 | Cheng |
| 2014/0334796 A1 | 11/2014 | Galant |
| 2014/0341528 A1 | 11/2014 | Mahate |
| 2014/0366052 A1 | 12/2014 | Ives |
| 2015/0015680 A1 | 1/2015 | Wang |
| 2015/0022355 A1 | 1/2015 | Pham |
| 2015/0029089 A1 | 1/2015 | Kim |
| 2015/0039646 A1 | 2/2015 | Sharifi |
| 2015/0067811 A1 | 3/2015 | Agnew |
| 2015/0071547 A1 | 3/2015 | Keating |
| 2015/0113009 A1 | 4/2015 | Zhou |
| 2015/0156247 A1 | 6/2015 | Hensel |
| 2015/0186073 A1 | 7/2015 | Pacurariu |
| 2015/0287435 A1 | 10/2015 | Land |
| 2015/0318020 A1 | 11/2015 | Pribula |
| 2015/0373281 A1 | 12/2015 | White |
| 2015/0375117 A1 | 12/2015 | Thompson |
| 2015/0382083 A1 | 12/2015 | Chen |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0094601 A1 | 3/2016 | Besehanic |
| 2016/0103830 A1 | 4/2016 | Cheong |
| 2016/0189752 A1 | 6/2016 | Galant |
| 2016/0225405 A1 | 8/2016 | Matias |
| 2016/0225410 A1 | 8/2016 | Lee |
| 2016/0234345 A1 | 8/2016 | Roberts |
| 2016/0260000 A1 | 9/2016 | Yamakawa |
| 2016/0286235 A1 | 9/2016 | Yamamoto |
| 2016/0292881 A1 | 10/2016 | Bose |
| 2016/0358603 A1 | 12/2016 | Azam |
| 2016/0366330 A1 | 12/2016 | Boliek |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2006001361 A1 | 1/2006 |

(56) References Cited

FOREIGN PATENT DOCUMENTS

| WO | 2009040538 | | 4/2009 |
|----|------------|----|--------|
| WO | 2012057623 | | 5/2012 |
| WO | 2012057623 | A1 | 5/2012 |
| WO | 2012086120 | A1 | 6/2012 |

OTHER PUBLICATIONS

Ernoult, Emeric, "How to Triple Your YouTube Video Views with Facebook", SocialMediaExaminer.com, Nov. 26, 2012, 16 pages.

PCT International Preliminary Report on Patentability for PCT/US2015/023680, dated Oct. 4, 2016, 10 pages.

PCT International Search Report for PCT/US15/23680 dated Aug. 3, 2015, 4 pages.

PCT International Search Report for PCT/US15/41624 dated Nov. 4, 2015, 5 pages.

PCT International Written Opinion for PCT/US2015/041624, dated Dec. 17, 2015, 7 pages.

PCT International Search Report and Written Opinion for PCT/US15/12086 dated Mar. 17, 2016, 20 pages.

Schroff et al., "FaceNet: A Unified Embedding for Face Recognition and Clustering," IEEE Conference on Computer Vision and Pattern Recognition (CVPR), 2016, 10 pgs.

Parkhi et al., "Deep Face Recognition," Proceedings of the British Machine Vision, 2015, 12 pgs.

Iandola et al., "SqueezeNet: AlexNet-level accuracy with 50x fewer parameters and <0.5MB model size," arXiv:1602.07360, 2016, 9 pgs.

Ioffe et al., "Batch Normalization: Accelerating Deep Network Training by Reducing Internal Covariate Shift," arXiv:1502.03167, 2015, 11 pgs.

He et al., "Deep Residual Learning for Image Recognition," arXiv:1512.03385, 2015, 12 pgs.

Han et al., Deep Compression: Compressing Deep Neural Networks with Pruning, Trained Quantization and Huffman Coding, International Conference on Learning Representations 2016, 14 pgs.

Iandola et al., "SqueezeNet: AlexNet-level accuracy with 50x fewer parameters and <0.5MB model size", arXiv:1602.07360v3 [cs.CV] Apr. 6, 2016 (9 pgs.).

Yang et al., "Unsupervised Extraction of Video Highlights Via Robust Recurrent Auto-encoders" arXiv:1510.01442v1 [cs.CV] Oct. 6, 2015 (9 pgs).

Tran et al., "Learning Spatiotemporal Features with 3D Convolutional Networks", arXiv:1412.0767 [cs.CV] Dec. 2, 2014 (9 pgs).

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.

Japanese Office Action for JP Application No. 2013-140131, dated Aug. 5, 2014, 6 pages.

Office Action for U.S. Appl. No. 13/831,124, dated Mar. 19, 2015, 14 pages.

PSonar URL: http://www.psonar.com/about retrieved on Aug. 24, 2016, 3 pages.

* cited by examiner

SYSTEMS AND METHODS FOR DETERMINING A SAMPLE FRAME ORDER FOR ANALYZING A VIDEO

This disclosure relates to systems and methods for determining a sample frame order for analyzing a video.

BACKGROUND

Videos comprise a number of video frames ordered in a sequence. Longer videos typically include several video frames. Analyzing a video to generate and/or determine information related to the video typically requires a sequential analysis of each frame of the video until the entire video is processed. As such, an output representing the entire video is only fully realized once every frame has been processed.

Typically, for some types of video, content may be captured continuously (e.g., without user controlled cuts and/or transitions) such that it begins recording before of an event and/or experience and may not stop recording until after the event and/or experience has ended. Such continuous capture video content may be long in duration.

SUMMARY

This disclosure relates to determining a sample frame order for analyzing a video. A video may be analyzed to determine one or more features of the video. Typical methods of analyzing a video via a sequential analysis of each frame from beginning to end may impact efficiency of such analysis because the full quantity of frames in a video must be analyzed before obtaining any information representing the full length of the video. This problem may be amplified for videos having longer durations. For example, continuous-capture-type video content. The systems and methods described herein may include a multiple iteration technique that progressively samples the full range of a video. The multiple iteration technique may use breadth first traversal of a binary tree to progressively sample the full video. As such, for individual ones of the iterations and/or at individual depths of traversal, the output and/or analysis of the video may be fully temporally realized such that it represents the full length of the video. As iterations and/or depth increases, more frames may be included in the sample frame order. This may refine and/or increase fidelity of the information obtained for a video via an analysis of the video according to the sample frame order. In some implementations, the information obtained may include one or more features of the video. The analysis of the video may stop at a given iteration and/or depth of traversal. As such, a given number of iterations and/or depth may provide a satisfactory evaluation of the entire video before and/or without analyzing each and every frame sequentially.

Information defining a video may be obtained. The information defining the video may include, for example, one or more electronic files. The electronic files may include a video file. The electronic files may be obtained from electronic storage of one or more video capture devices. The electronic files may define video content included in the video. The video may include one or more of a visual component, an audio component, and/or other components. The visual component may include multiple frames. The multiple frames may be presented in an ordered sequence from a beginning to an end of the video. The audio component may include recorded and/or provided audio that may accompany the visual component. The audio component may be synchronized with the visual component. Information defining the video may further include metadata associated with the video.

A system that determines a sample frame order for analyzing a video may include one or more physical processors and/or other components. The one or more physical processors may be configured by machine-readable instructions. Executing the machine-readable instructions may cause the one or more physical processors to determine a sample frame order for analyzing a video. The machine-readable instructions may include one or more computer program components. The computer program components may include one or more of a video component, a sample frame order component, an interval component, an analysis component, a feature component, and/or other computer program components.

The video component may be configured to obtain one or more electronic files. The one or more electronic files may define video content included in the video. The video may have multiple frames ordered in a sequence from a beginning to an end.

The sample frame order component may be configured to determine a first sample frame order for analyzing the video. The first sample frame order may be determined based on multiple iterations. The quantity of iterations may indicate a depth of the sample of the video. For example, less than five iterations may indicate a less in-depth sample of the video than five or more iterations.

Determining the first sample frame order may include determining an initial frame for a first iteration. The sample frame order component may be configured determine the initial frame based on a function of frame position in the sequence of frames between the beginning of the video and the end of the video. The initial frame may have an initial frame position in the sequence of frames. In some implementations, the initial frame position may include a midpoint of the video, or a frame adjacent to the midpoint of the video. Determining the initial frame may include determining a frame in the sequence of frames that is an equal number of frames, or one frame away from an equal number of frames, from the beginning of the video and from the end of the video.

The sample frame order component may be configured to associate the initial frame with a first sample position in a first sample frame order. The first sample frame order may be different from the sequence of frames. The first sample frame order may represent an order in which sample frames from the video may be analyzed to determine one or more features of the video.

Determining the first sample frame order may include determining secondary frames for a second iteration. The sample frame order component may be configured to determine the secondary frames based on a function of frame position in the sequence of frames between the beginning of the video and the initial frame position, and/or between the initial frame position and the end of the video. The secondary frames may include a first secondary frame, a second secondary frame, and/or other secondary frames.

The first secondary frame may have a first secondary frame position in the sequence of frames. The second secondary frame may have a second secondary frame position in the sequence of frames. The first secondary frame position may be located at a secondary midpoint between the beginning of the of the video and the initial frame position or adjacent to the secondary midpoint between the beginning of the of the video and the initial frame position. The second secondary frame position may be located at a secondary midpoint between the initial frame position and the end of the video or adjacent to the secondary midpoint between the initial frame position and the end of the video.

The sample frame order component may be configured to associate the secondary frames with secondary sample positions in the first sample frame order. The secondary sample positions may come after the first sample position and/or before any other sample positions in the first sample frame order. As such, the secondary fames associated with the secondary sample positions may be analyzed after the initial frame associated with the first sample position and/or before any other frames associated with the other sample positions. The first position in the first sample frame order may represent a first depth pass of the video. The secondary positions in the first sample frame order may represent a second depth pass of the video.

Determining the first sample frame order may include determining tertiary frames for a third iteration. The sample frame order component may be configured to determine the tertiary frames based on a function of frame position in the sequence of frames between the beginning of the video and the first secondary frame position, the first secondary frame position and the initial frame position, the initial frame position and the second secondary frame position, the second secondary frame position and the end of the video, and/or any other frame positions and the beginning and/or end of the video. The sample frame order component may be configured to associate the tertiary frames with tertiary sample positions in the first sample frame order.

The sample frame order component may be configured to perform multiple iterations to determine the first sample frame order. The multiple iterations may include a quantity of iterations beyond the first iteration, the second iteration, the third iteration, a fourth iteration, a fifth iteration, a sixth iteration, and/or other iterations. Determining the first sample frame order may include determining, for individual ones of the quantity of iterations, other sets of frames to be associated with other sample positions in the first sample frame order. The other sets of frames may be determined based on a function of frame position in the sequence of frames between a previously determined frame determined during an immediately preceding iteration within the multiple iterations, and one of the beginning of the video, the end of the video, or another previously determined frame determined during another preceding iteration. In some implementations, the quantity of iterations may depend on the length of the video.

The interval component may be configured to determine an interval between a frame position in the sequence of frames determined for a given iteration and another frame position in the sequence of frames determined for an iteration immediately preceding the given iteration. The interval component may be configured to determine the interval between two frames identified during two consecutive iterations to determine how in-depth of a sample of the video the sample frame order currently represents. The interval component may be configured to determine whether the interval is at least equal to or less than a threshold interval. Responsive to the interval being at least equal to or less than the threshold interval, the video may be analyzed by the analysis component.

The analysis component may be configured to analyze the video. The analysis component may analyze the video according to the first sample frame order. Analyzing the video may include processing the video in the first frame order to determine information associated with the video.

The feature determination component may be configured to determine a first feature of the video. The feature determination component may be configured to determine a first feature of the video based on an analysis of the frames in the video performed on the frames in the first sample frame order. The first feature of the video may include one or more of a goodness score, a motion metric, a shape metric, a face metric, a persistence metric, and/or other features of the video.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
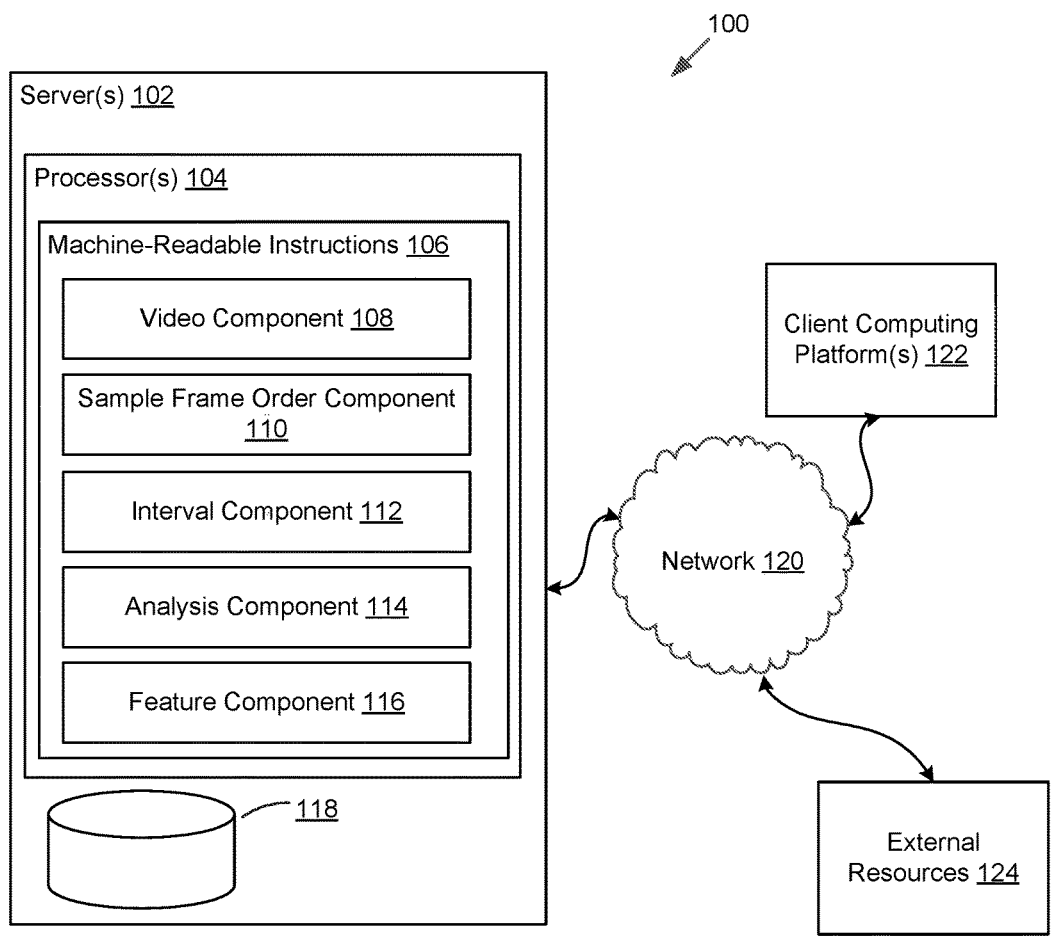
FIG. 1 illustrates a system configured to determine a sample frame order for analyzing a video, in accordance with one or more implementations.

FIG. 1 illustrates a system 100 configured to determine a sample frame order for analyzing a video. Analyzing a video according to a sample frame order may enable an analysis of the full temporal range of the video more efficiently than a typical sequential analysis of each frame. In existing methods, the entire sequence of frames must be processed before a fully temporally realized representation of the output can be generated. Determining a sample frame order as described herein may progressively identify sample frames that represent the full video. The present application describes a multiple pass technique that may use breadth-first traversal of a binary tree, representing a sequence of frames of a video, to progressively sample the full range of the video and determine the sample frame order. Individual iterations performed may represent a depth of traversal of the binary tree. As the number of iterations and/or depth of the traversal increases, the fidelity of the result may be refined and/or increased as more frames of the video are included in the sample frame order. Therefore, the fidelity and/or accuracy of the analysis desired may dictate how many iterations are performed and/or at what depth to stop traversing the tree representing the video. In some implementations, the full length of the video may be represented by a sample frame order that does not include every frame in the video. As such, analysis of the sample frame order may represent an analysis of the full video before analyzing, or without having to analyze, every frame in the video.

The system 100 may comprise one or more of a server 102, one or more computing platforms 122, and/or other components. Individual computing platforms 122 may include one or more of a cellular telephone, a smartphone, a digital camera, a laptop, a tablet computer, a desktop computer, a television set-top box, smart TV, a gaming console, a client computing platform, and/or other platforms.

The server 102 may include one or more physical processor(s) 104 configured by machine-readable instructions 106. Processor(s) 104 may be configured to provide information processing capabilities in system 100. As such, processor(s) 104 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor(s) 104 may be configured by machine-readable instructions 100. Executing machine-readable instructions 106 may facilitate determining a sample frame order for analyzing a video. Machine-readable instructions 100 may include one or more computer program components. The machine-readable instructions 106 may include one or more of a video component 108, a sample frame order component 110, an interval component 112, an analysis component 114, a feature component 116, and/or other components.

One or more features and/or functions of server 102 may be configured to facilitate generation, obtaining, processing, analyzing, editing, and/or distribution of videos. It is noted that although the present disclosure is directed to videos and/or video clips, one or more other implementations of system 100 and/or server 102 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items. In some implementations, photos may be associated with one or more of multi-shot photo modes, time-lapse modes, and/or burst shot modes of a camera.

Users of system 100 may comprise individuals and/or entities that provide, generate, process, analyze, edit, and/or distribute one or more of videos, video clips, and/or other media items. Individual videos may comprise continuous capture video, a compilation of video clips, and/or other videos. By way of non-limiting example, system 100 may be configured to receive videos captured by users.

Video component 108 may be configured to obtain one or more electronic files that define video content included in the video. The video content my include multiple frames of a video. Video component 108 may be configured to obtain one or more electronic files defining the video content included in the video from one or more or electronic storage 118, client computing platforms 122, external resources 124, and/or other sources. The video content may be captured by one or more capturing devices from which the information defining one or more of the video content, audio content, metadata, and/or other information may be uploaded and/or transmitted to one or more of electronic storage 118, client computing platforms 122, external resources 124, and/or other sources. The video may have multiple frames ordered in a sequence from a beginning to an end. The individual frames within the sequence of frames may have a frame position indicating their location between the beginning of the video and the end of the video.

By way of non-limiting example, videos may be captured using one or more image capturing devices. An image capturing device may include one or more of a computing platform 122, a mobile device (e.g., a smart phone, a tablet, and/or other mobile device), a camera (e.g., an action camera, a sports camera, and/or other type of camera), a video recorder, and/or other device suitable to capture, upload, transmit, edit, and/or distribute videos and/or video clips. To simplify and clarify the present description, image capture devices may be referred to generally as "cameras," however it is to be understood that this is not to be considered limiting as other types of image capture devices may be employed. A given camera may include one or more sensors including one or more a GPS, gyro, compass, accelerometer, temperature sensor, pressure sensor, depth sensor, an image sensor (e.g., an electromagnetic transducer), a sound transducer, and/or other sensors. The cameras may be configured to store and/or transmit information defining one of more videos. The information defining one or more videos may include video content, audio content, metadata, and/or other content included in one or more electronic files. In some implementations, the metadata associated with a video may include one or more of capture settings of one or more capture devices used to capture the video, sensor output of one or more sensors coupled to the one or more capture devices, user-provided information, and/or other information.

In some implementations, server 102 may be configured to provide remote hosting of the features and/or functions of server 102 to one or more computing platforms 122. The one or more computing platforms 122 may be remotely located from the server 102. In some implementations, one or more features and/or functions of server 102 may be attributed as local features and/or functions of one or more computing platforms 122. By way of non-limiting example, individual ones of computing platforms 122 may include machine-readable instructions comprising the same or similar components as machine-readable instructions 106 of server 102. The computing platforms 122 may be configured to locally execute one or more components that may be the same or similar to the components of machine-readable instructions 106.

By way of non-limiting example, one or more features and/or functions attributed to server 102 may be provided at a client-end application that may be installed on a computing platform 122. In some implementations, one or more features and/or functions attributed to server 102 may be configured as a cloud-based application that a user may access via computing platform 122. In some implementations, an application providing one or more features and/or functions attributed herein to server 102 may be configured to be part client-end and part cloud based. Further, it is noted that the one or more computing platforms, servers, and/or other machines executing a client-based application and/or a cloud-based application may comprise one or more of one or more processors, memory storage configured to store and/or execute program code corresponding to the processes described herein, and/or other components.

Electronic storage 118 may include electronic storage medium that electronically stores information. Electronic storage 118 may store software algorithms, information determined by processor 104, information received remotely, and/or other information that enables system 100 to function properly. For example, electronic storage 118 may store information relating to videos, frames, frame positions, sample frame order(s), and/or other information.

Sample frame order component 110 may be configured to determine a sample frame order for analyzing a video. The sample frame order may be determined based on multiple iterations. The multiple iterations may represent multiple depth passes through the video. At each depth, a pass through the video may identify one or more sample frames. For example, the further in-depth a pass, the more frames may be identified and associated with sample frame positions in the sample frame order. In some implementations, a first iteration may be used to identify an initial frame to be associated with a first sample position in a sample frame order. Individual iterations after the first iteration may be used to determine one or more frames or sets of frames to add to the sample frame order after the first sample position.

Sample frame order component 110 may be configured to determine a sample frame order. For example, a first sample frame order may be determined. Determining a sample frame order may include determining an initial frame based on a function of frame position in the sequence of frames between the beginning of the video and the end of the video. The frames determined for individual ones of the multiple iterations may represent nodes in a binary tree. The function of frame position in the sequence of frames may include a midpoint, and/or a frame adjacent to the midpoint, between two or more defined positions in the video. For example, the two defined positions in the video may include one or more of: one or more parent nodes (e.g., frames determined during previous iterations), the beginning of the video, the end of the video, and/or another defined position in the video. In some implementations, an initial frame may be determined for the first iteration. The initial frame may have an initial frame position in the sequence of frames. The initial frame position may include a midpoint, and/or a frame position adjacent to the midpoint, between the beginning of the video and the end of the video.

As such, in some implementations, determining the initial frame based on the function of frame position in the sequence of frames between the beginning of the video and the end of the video may include determining a frame in the sequence of frames that is at the midpoint of the video and/or immediately adjacent to the midpoint of the video. By way of non-limiting example, the initial frame may represent the root (e.g., level 0) of a binary tree.

Figure 2:
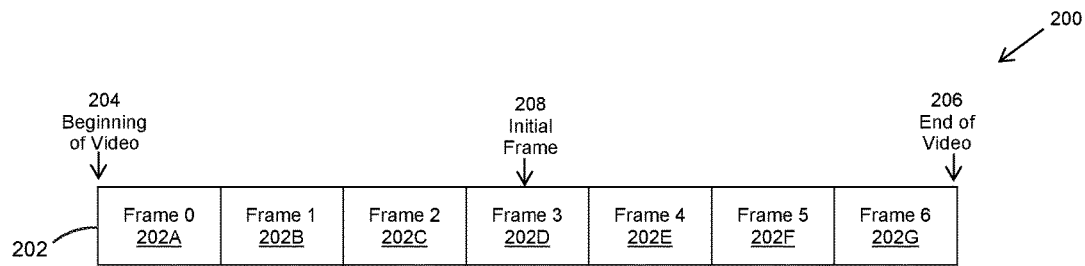
FIG. 2 illustrates an initial frame at an initial frame position in the sequence of frames of a video, in accordance with one or more implementations.

FIG. 2 illustrates an initial frame at an initial frame position in the sequence of frames of a video, in accordance with one or more implementations. Video 200 may include may have multiple frames 202 ordered in a sequence 202. Video 200 may have a beginning 204 and an end 206. Initial frame 208 may be located at an initial frame position 202D. Initial frame position 202D may include a midpoint of sequence of frames 202 between the beginning of the video 204 and the end of the video 206.

Figure 3:
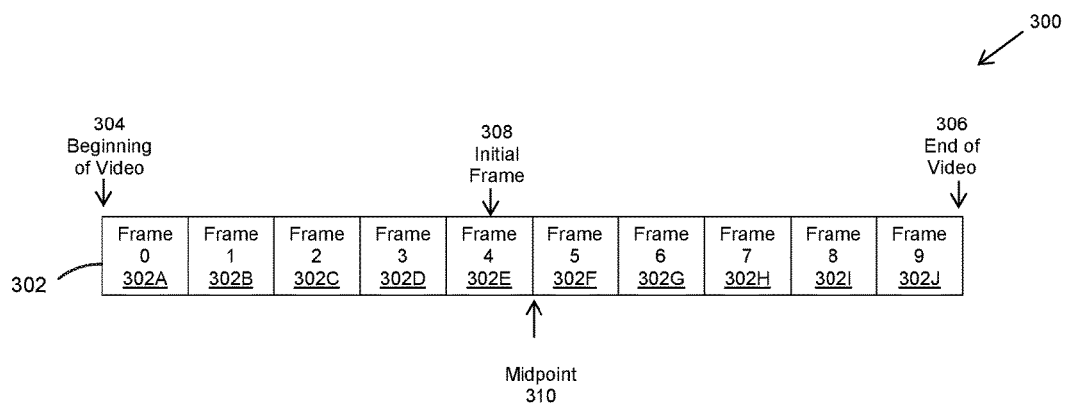
FIG. 3 illustrates an initial frame at an initial frame position in the sequence of frames of a video, in accordance with one or more implementations.

FIG. 3 illustrates an initial frame at an initial frame position in the sequence of frames of a video, in accordance with one or more implementations. Video 300 may include may have multiple frames 302 ordered in a sequence 301. Video 300 may have a beginning 304 and an end 306. Initial frame 308 may be located at an initial frame position 302E. Initial frame position 302E may be adjacent to a midpoint 310 of sequence of frames 301. Because video 300 has an even quantity of frames, initial frame 308 cannot have an initial frame position directly located at midpoint 310. As such, initial frame 308 may be determined because it is adjacent to midpoint 310. At least two frames (e.g., Frame 4 302E and Frame 5 302F) may be located adjacent to midpoint 310. In some implementations, a user may indicate which adjacent frame to designate as initial frame 308. A user may indicate which adjacent frame to designate as initial frame 308 via a user setting for multiple videos, one or more selections for individual ones of the multiple videos, and/or via other methods.

Returning to FIG. 1, sample frame order component 110 may be configured to associate the initial frame with a first sample position in a first sample frame order. The first sample frame order may represent an order in which a sample of frames, representing the video, are to be processed and/or analyzed. The sample frame order (e.g., the first sample frame order) may be different from the sequence of frames of the video. A quantity of frames in the sample frame order may differ based on the quantity of iterations performed and/or the depth of the sample.

Associating one or more frames with one or more sample positions in a sample frame order may include storing information indicating an association of the one or more frames with one or more sample positions in the sample frame order. The information indicating an association may include location information (e.g., a frame position within the sequence of frames), metadata, content information (e.g. indicating the content of the one or more frames, time information (e.g., within the duration of the video), and/or other information.

Sample frame order component 110 may be configured to determine one or more secondary frames based on a function of frame position in the sequence of frames between the beginning of the video and the initial frame position, between the initial frame position and the end of the video, and/or between any other defined positions in the video. In some implementations, the secondary frames may be determined for a second iteration. The secondary frames may include one or more of a first secondary frame, a second secondary frame, and/or other secondary frames. The first secondary frame may have a first secondary frame position in the sequence of frames. The second secondary frame may have a second secondary frame position in the sequence of frames. The first secondary frame position may be located at a secondary midpoint between the beginning of the of the video and the initial frame position, or adjacent to the secondary midpoint between the beginning of the of the video and the initial frame position. The second secondary frame position may be located at a secondary midpoint between the initial frame position and the end of the video, or adjacent to the secondary midpoint between the initial frame position and the end of the video.

In some implementations, determining the secondary frames based on the function of frame position in the sequence of frames between the beginning of the video and the initial frame position and/or between the initial frame position and the end of the video, may include determining a frame in the sequence of frames that is at one or more secondary midpoints between the beginning of the video and the initial frame position, and/or between the initial frame position and the end of the video. By way of non-limiting example, the one or more secondary frames may represent a first level of the binary tree. The one or more secondary frames may be child nodes of the root node in the binary tree representing the video. In some implementations, as depth of the sample increases, the quantity of the frames in the sample frame order and/or the quantity of frames determined for a given iteration may increase. By way of example, individual nodes in the binary tree (e.g., representing individual frames included in the same frame order) determined for individual iterations may have one or two child nodes determined an immediately subsequent iteration.

Figure 4:
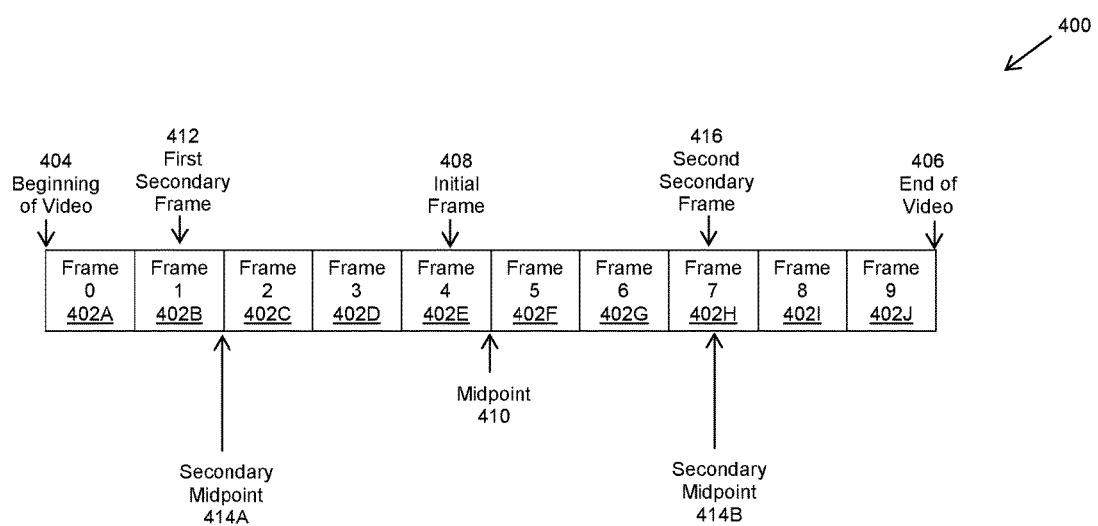
FIG. 4 illustrates secondary frames at secondary frame positions in the sequence of frames of a video, in accordance with one or more implementations.

FIG. 4 illustrates secondary frames at secondary frame positions in the sequence of frames of a video, in accordance with one or more implementations. Video 400 may have multiple frames 402 ordered in a sequence 401. Video 400 may have a beginning 404 and an end 406. Initial frame 408 may be located at an initial frame position 402E. Initial frame position 402E may be adjacent to a midpoint 410 of sequence 401 of frames. First secondary frame 412 may be located at a first secondary frame position 402B. First secondary frame position 402B may be located adjacent to secondary midpoint 414A. Secondary midpoint 414A may indicate a midpoint between the beginning of the video 404 and the initial frame 408. The second secondary frame 416 may be located at second secondary frame position 402H. Second secondary frame position 402H may be located at secondary midpoint 414B between initial frame position 402E and end of video 406.

Returning to FIG. 1, sample frame order component 110 may be configured to associate the one or more secondary frames with secondary sample positions in the sample frame order. The first secondary frame and the second secondary frame may be associated with secondary sample positions in the first sample frame order. The one or more secondary sample positions may come after the first sample position and before any other sample positions in the first sample frame order. As such, responsive to an analysis of the video according to the sample frame order, the one or more secondary frames associated with the secondary sample positions may be analyzed after the initial frame associated with the first sample position and before any other frames associated with the other sample positions.

One or more of the frames associated with positions in the first sample frame order may be associated within a given level of positions based on an order in which the multiple frames are included in the video. For example, the one or more secondary frames may be associated with the secondary sample positions based on an order in which the first secondary frame and the second secondary frame are positioned in the sequence of frames. In some implementations, the first secondary frame may be associated with a first secondary position located before a second secondary position in the first sample frame order by virtue of the first secondary frame position coming before the second secondary frame position in the sequence of frames. As such, for example, a frame that occurs (e.g., in the duration of the video) before the other frames determined for a given iteration may be associated with a first sample frame position within a given level of sample frame positions corresponding to the given iteration.

In some implementations, determining the first sample frame order may further include determining tertiary frames. Sample frame order component 110 may be configured to determine one or more tertiary frames. The one or more tertiary frames may be determined for a third iteration. Sample frame order component 110 may be configured to determine one or more tertiary frames based on a function of frame position in the sequence of frames between one or more of: the beginning of the video and the first secondary frame position; the first secondary frame position and the initial frame position; the initial frame position and the second secondary frame position; the second secondary frame position and the end of the video; and/or any other frame position and/or defined positions within the video.

Sample frame order component 110 may be configured to associate one or more of the tertiary frames with tertiary sample positions in the first sample frame order. The one or more tertiary sample positions may come after the first sample position and the second sample positions, and before any other sample positions in the first sample frame order. Thus, analyzing the video according to the sample frame order may include analyzing the one or more tertiary frames associated with the tertiary sample positions after analyzing the one or more secondary fames associated with the secondary sample positions and after analyzing the initial frame associated with the first sample position; and before any other frames associated with the other sample positions.

In some implementations, sample frame order component 110 may be configured to determine a same frame order based on multiple iterations. The multiple iterations may include a quantity of iterations beyond the first iteration, the second iteration, the third iteration, and/or other iterations. For example, the multiple iterations may further include a fourth iteration, a fifth iteration, a sixth iteration, a seventh iteration, an eight iteration, a ninth iteration, a tenth iteration, and/or any other iteration (e.g., $n^{th}$ iteration). The quantity of iterations may indicate a depth of the progressive sample of the video. For example, less than five iterations may indicate a less in-depth sample of the video than five or more iterations.

Determining the first sample frame order may include determining, for individual ones of the quantity of iterations, other sets of frames to be associated with other sample positions in the first sample frame order. The other sets of frames may be determined based on a function of frame position in the sequence of frames between a previously determined frame determined during an immediately preceding iteration within the multiple iterations, and one or more of: the beginning of the video, the end of the video, another previously determined frame determined during another preceding iteration, and/or any other defined position within the video.

Figure 5:
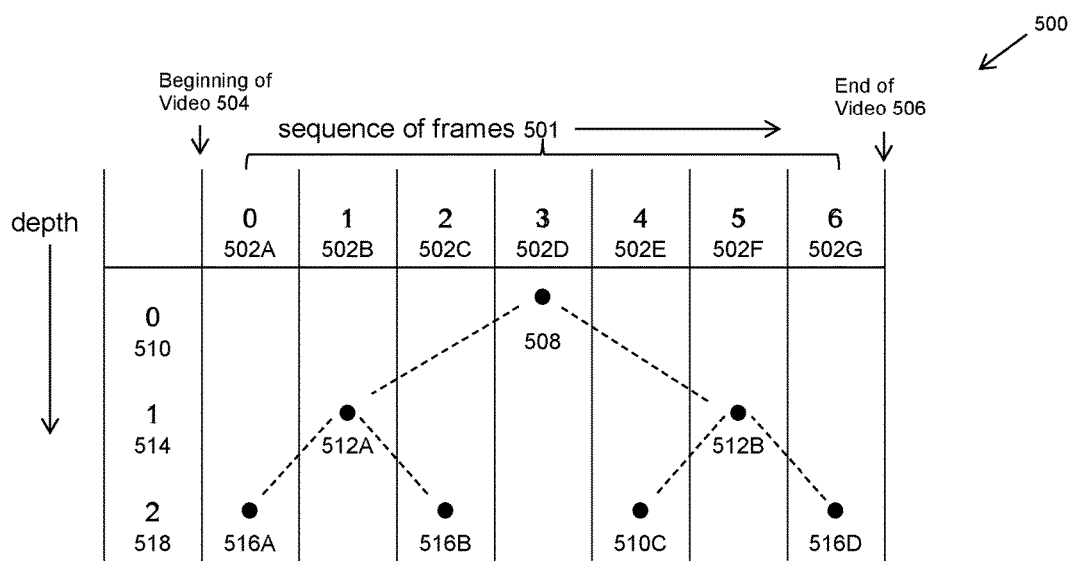
FIG. 5 illustrates an exemplary traversal tree for determining a sample frame order including three iterations, in accordance with one or more implementations.

FIG. 5 illustrates an exemplary traversal tree for determining a sample frame order including three iterations, in accordance with one or more implementations. Traversal tree 500 may represent the sequence of frames 501 of a video having 7 frames. Initial frame 508 may be determined for a first iteration representing zero-depth pass 510 of video. Initial frame 508 may be determined based on a function of frame position in sequence of frames 502 between the beginning of the video 504 and the end of the video 506. In some implementations, initial frame 508 may include frame 3 based on its initial frame position 502D being located at a midpoint between the beginning 504 and the end 506 of video 501. Initial frame 508 may be associated with a first sample position in a sample frame order.

Secondary frames 512 may be determined for a second iteration representing first-depth pass 514 of the video. Secondary frames 512 may be determined based on a function of frame position in sequence of frames 502 between the beginning of the video 504 and initial frame position 502D; and between initial frame position 502D and the end of the video 506. In some implementations, secondary frames 512 may include frame 1 (e.g., first secondary frame) and frame 5 (e.g., second secondary frame) based on their frame positions 502B and 502F (e.g., first secondary frame position and second secondary frame position respectively) being located at secondary midpoints between the beginning of the video 504 and initial frame position 502D, and initial frame position 502D and the end of the video 506. Secondary frames 512 may be associated with secondary sample positions in the sample frame order.

Tertiary frames 516 may be determined for a third iteration representing a second-depth pass 518 of video 501. Tertiary frames 516 may be determined based on a function of frame position in sequence of frames 502 between the beginning 504 of video 501 and first secondary frame position 502B, between the first secondary frame position 502B and initial frame position 502D, between the initial frame position 502D and second secondary frame position 502F, and between the second secondary frame position 502F and the end 506 of video 501. In some implementations, tertiary frames 516 may include frame 0, frame 2, frame 4, and frame 6 based on their frame positions 502A, 502C, 502E, and 502G being located at tertiary midpoints between the beginning 504 of video 501 and first secondary frame position 502G, between the first secondary frame position 502B and initial frame position 502D, between the initial frame position 502D and second secondary frame position 502F, and between the second secondary frame position 502F and the end of the video 506. Tertiary frames 516 may be associated with tertiary sample positions in the sample frame order. The sample frame order for traversal tree 500 may include [Frame 3, Frame 1, Frame 5, Frame 0, Frame 2, Frame 4, Frame 6]. Frames 502 of video 501 may be analyzed according to the sample frame order such that Frame 3 may be analyzed first and/or frame 6 may be analyzed last.

Figure 6:
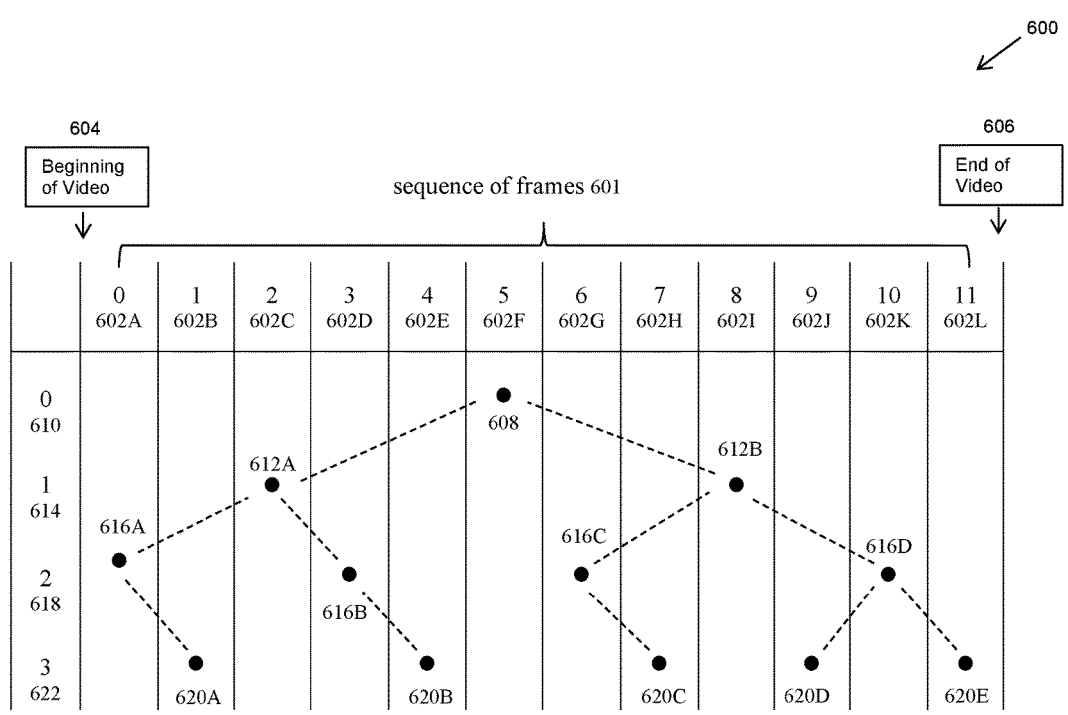
FIG. 6 illustrates an exemplary traversal tree for determining a sample frame order including four iterations, in accordance with one or more implementations.

FIG. 6 illustrates an exemplary traversal tree for determining a sample frame order including four iterations, in accordance with one or more implementations. Traversal tree 600 may represent the sequence of frames 601 for a video having 12 frames. Initial frame 608 may be determined for a first iteration representing zero-depth pass 610 of video 601. Initial frame 608 may be determined based on a function of frame position in sequence of frames 602 between the beginning of the video 604 and the end of the video 606. In some implementations, initial frame 608 may include frame 5 based on its initial frame position 602F being located adjacent to a midpoint between the beginning 604 and the end of the video 606. Initial frame 608 may be associated with a first sample position in a sample frame order.

Secondary frames 612 may be determined for a second iteration representing first-depth pass 614 of the video represented by sequence of frames 601. Secondary frames 612 may be determined based on a function of frame position in sequence of frames 602 between the beginning of the video 604 and initial frame position 602F; and between initial frame position 602F and the end of the video 606. In some implementations, secondary frames 612 may include frame 2 (e.g., first secondary frame) and frame 8 (e.g., second secondary frame) based on their frame positions 602C and 602I (e.g., first secondary frame position and second secondary frame position respectively) being located at a secondary midpoint between the beginning of the video 604, and/or adjacent to a secondary midpoint between initial frame position 602F and the end of the video 606. Secondary frames 612 may be associated with secondary sample positions in the sample frame order.

Tertiary frames 616 may be determined for a third iteration representing a second-depth pass 618 of the video represented by sequence of frames 601. Tertiary frames 616 may be determined based on a function of frame position in sequence of frames 602 between the beginning of the video 604 and first secondary frame position 602C, between the first secondary frame position 602C and initial frame position 602F, between the initial frame position 602F and second secondary frame position 602I, and between the second secondary frame position 602I and the end of the video 606. In some implementations, tertiary frames 616 may include frame 0, frame 3, frame 6, and frame 10 based on their frame positions 602A, 602D, 602G, and 602K being located at tertiary midpoints between the beginning of the video 604 and first secondary frame position 602C, between the first secondary frame position 602C and initial frame position 602F, between the initial frame position 602F and second secondary frame position 602I, and between the second secondary frame position 602I and the end of the video 606. Tertiary frames 616 may be associated with tertiary sample positions in the sample frame order.

One or more other frames 620 (e.g., quaternary frames, and/or other frames) may be determined for a fourth iteration representing a third-depth pass 622 of the video represented by sequence of frames 601. Other frames 620 may be determined based on a function of frame position in sequence of frames 602 between the beginning of the video 604, one or more frame positions 602 of tertiary frames 616, one or more frame positions 602 of secondary frames 612, initial frame position 602F of initial frame 608, the end of the video 606, and/or other positions within the video represented by sequence of frames 601. In some implementations, other frames 620 may include frame 1, frame 4, frame 7, frame 9, and frame 11, frame 2, frame 4, and frame 6 based on their frame positions 602B, 602E, 602H, 602J, and 602L being located at or adjacent to other midpoints between one or more of: beginning of the video 604, initial frame position 602F, first secondary frame position 602C, second secondary frame position 602I, one or more tertiary frame positions 602A, 602D, 602G, and 602K, the end of the video 606, and/or other positions. One or more other frames 620 may be associated with other sample positions in the sample frame order. The other sample positions may be after the tertiary sample positions.

The sample frame order for traversal tree 600 may include [Frame 5, Frame 2, Frame 8, Frame 0, Frame 3, Frame 6, Frame 10, Frame 1, Frame 4, Frame 7, Frame 9, Frame 11]. Frames 602 of the video may be analyzed according to the sample frame order such that Frame 5 may be analyzed first and/or frame 11 may be analyzed last. In some implementations, not illustrated, determining the sample frame order for the video represented by sequence of frames 601 may stop at a third iteration at second-depth pass 618. As such, no other frames may be determined and/or the sample frame order may not include every frame in sequence of frames 602.

Returning to FIG. 1, interval component 112 may be configured to determine an interval between two or more frame positions determined for one or more iterations. Interval component 112 may be configured to determine an interval between a frame position in the sequence of frames determined for a given iteration and another frame position in the sequence of frames determined for an iteration immediately preceding the given iteration.

Interval component 112 may be configured to determine whether the interval is at least equal to or less than a threshold interval. The threshold interval may include a time period, a number of frames, and/or any other representation of distance within a video between two frame positions determined for one or more intervals and associated with one or more positions in the sample frame order at which the multiple iterations may end and the sample frame order may be considered complete. In some implementations, the threshold interval may be set, determined, and/or adjusted by one or more users. The threshold interval may affect the quantity of iterations required to determine the sample frame order. By way of non-limiting example, in some implementations, if the threshold interval is set to 0.5 seconds for a two minute video, the quantity of iterations for determining the first sample frame order may be 8 iterations such that the time period between two frames of the video associated with two consecutive sample frame positions in the sample frame order is less than or equal to 0.5 seconds.

The interval may be a time period between two frame positions in the sequence of frames for frames associated with two consecutive sample frame positions in the sample frame order. By way of non-limiting example, determining an interval between sample frames (e.g., frames associated with sample positions in a sample frame order) may enable the system to stop traversing at a particular depth according to some accuracy and/or temporal heuristic (e.g., a threshold interval, etc.). The interval may indicate how close together frames associated with positions in a given frame order are. As such, the interval may indicate a depth of accuracy of the sample frame order representing a video.

A smaller interval may indicate more frames associated with sample frame positions in the sample frame order, and/or a more in-depth sample of the video compared to a larger interval. By way of non-limiting example, an interval of less than or equal to two seconds for a second iteration may indicate the time period between one or more of: the initial frame and the first secondary frame; the initial frame and the second secondary frame, the first secondary frame and the beginning of the video, and the second secondary frame and the end of the video, and/or other frames is less than or equal to 2 seconds.

Interval component 112 may be configured to determine whether the interval is equal to or less than a threshold interval. The video may be analyzed and/or a first feature determined responsive to the interval being equal to or less than the threshold interval. The interval being at least equal to or less than the threshold interval may indicate the determination of the sample frame order is complete and/or sufficient for a desired depth sample of the video (e.g., for the depth of analysis determined and/or set by the user via determining and/or setting the threshold interval). By way of non-liming example, a smaller threshold interval may indicate that the frames associated with positions in the sample frame order are closer together in the sequence of frames providing a more in-depth sample representation of the video compared to frames associated with positions in the sample frame order being farther apart in the sequence of frames.

Analysis component 114 may be configured to determine one or more features of the video. The one or more features of the video may be determined based on an analysis of the video in the determined sample frame order. In some implementations, a first feature of the video may be determined by analysis component 114 based on an analysis of the frames in the video performed on the frames in the first sample frame order. An analysis of the frames in the video performed on the frames in the first sample frame order may include processing the frames in accordance with the first sample frame order to determine information associated with the frames. In some implementations, for example, a feature of a video determined by analyzing the frames in the sample frame order may represent the video as a whole based while only requiring analysis of the frames in the sample frame order.

The feature(s) of the video determined by analysis component 114 may include one or more of: a goodness score, a motion metric, a shape metric, a face metric, a persistence metric, an interest score, and/or other features of the video. A goodness score may represent the quality of a given frame and/or video. By way of non-limiting example, a goodness score may be determined based on one or more of: resolution, brightness, contrast, color histogram, blur/sharpness, number of human faces present, the generating/capturing device, the motion of the camera and/or the motion intent (e.g., pan left, pan right, track an object or person, etc.), the detection of a scene (e.g., forest, beach, city, etc.), the detection of an activity (e.g., surfing, mountain biking, etc.), and/or other factors. The interest score may characterize "interestingness" of one or more frames." "Interestingness" may be based on one or more parameters including quality, scene features (e.g., feature points, objects, faces, colors, scene compilation, and/or other scene features), capture parameters (e.g., a resolution, a frame rate, one or more lens settings, and/or other capture parameters), and/or other parameters.

While the present disclosure may be directed to videos, one or more other implementations of the system may be configured for other types media content. Other types of media content may include one or more of audio content (e.g., music, podcasts, audio books, and/or other audio content), multimedia presentations, photos, slideshows, and/or other media content.

Although processor(s) 104 is shown in FIG. 1 as a single entity, this is for illustrative purposes only. In some implementations, processor(s) 104 may comprise a plurality of processing units. These processing units may be physically located within the same device, or processor(s) 104 may represent processing functionality of a plurality of devices operating in coordination. Processor(s) 104 may be configured to execute one or more components by software; hardware; firmware; some combination of software, hardware, and/or firmware; and/or other mechanisms for configuring processing capabilities on processor(s) 104.

The server 102, computing platforms 122, external resources 124, and/or other entities may be operatively linked via one or more electronic communication links. For example, such electronic communication links may be established, at least in part, via one or more networks 120. In some implementations, a network 120 may comprise the Internet and/or may employ other communications technologies and/or protocols. By way of non-limiting example, network 120 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, network 120 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over network 120 may be represented using formats including one or more of hypertext markup language (HTML), extensible markup language (XML), and/or other formats. One or more exchanges of information between entities of system 100 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 100 may use custom and/or dedicated data communications technologies instead of, or in addition to, the ones described above.

It will be appreciated that this is not intended to be limiting and that the scope of this disclosure includes implementations in which server 102, computing platforms 122, external resources 124, and/or other entities may be operatively linked via some other communication media.

External resources 124 may include sources of information, hosts, and/or other entities outside of system 100, external entities participating with system 100, and/or other resources. In some implementations, some or all of the functionality attributed herein to external resources 124 may be provided by resources included in system 100.

The server 102 may include electronic storage 118. The server 102 may include communication lines or ports to enable the exchange of information with a network and/or other entities. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 118 may comprise electronic storage media that electronically stores information. The electronic storage media of electronic storage 118 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetical tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). The electronic storage 118 may store software algorithms, information determined by processor(s) 104, information received from server 102, information received from computing platforms 122, and/or other information that enables server 102 to function as described herein.

Processor(s) 104 may be configured to provide information-processing capabilities in server 102. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more processing units. These processing units may be physically located within the same device, or processor 104 may represent processing functionality of a plurality of devices operating in coordination. The processor 104 may be configured to execute components 106, 108, 110, 112, 114, and/or 116. Processor 104 may be configured to execute components 106, 108, 110, 112, 114, and/or 116 by software; hardware; firmware; some combination of software, hardware, and/or firmware; and/or other mechanisms for configuring processing capabilities on processor 104.

It should be appreciated that although components 108, 110, 112, 114, and/or 116 are illustrated in FIG. 1 as being co-located within a single processing unit, in implementations in which processor 104 includes multiple processing units, one or more of components 108, 110, 112, 114, and/or 116 may be located remotely from the other components. The description of the functionality provided by the different components 108, 110, 112, 114, and/or 116 described above is for illustrative purposes and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, 116, and/or other components. As another example, processor 104 may be configured to execute one or more additional components that may perform some or all of the functionality attributed below to one of components 108, 110, 112, 114, and/or 116.

It should be appreciated that although computer components are illustrated in FIG. 1 as being co-located within a single processing unit, in implementations in which processor(s) 104 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 108, 110, 112, 114, and/or 116 may be eliminated, and some or all of its functionality may be provided by other computer program components. As another example, processor(s) 104 may be configured to execute one or more additional computer program components that may perform some or all of the functionality attributed to one or more of computer program components 108, 110, 112, 114, and/or 116 described herein.

The electronic storage media of electronic storage 118 may be provided integrally (i.e., substantially non-removable) with one or more components of system 100 and/or removable storage that is connectable to one or more components of system 100 via, for example, a port (e.g., a USB port, a Firewire port, etc.) or a drive. (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 118 may be a separate component within system 100, or electronic storage 118 may be provided integrally with one or more other components of system 100 (e.g., processor(s) 104). Although electronic storage 118 is shown in FIG. 1 as a single entity, this is for illustrative purposes only. In some implementations, electronic storage 118 may comprise a plurality of storage units. These storage units may be physically located within the same device, or electronic storage 118 may represent storage functionality of a plurality of devices operating in coordination.

Figure 7:
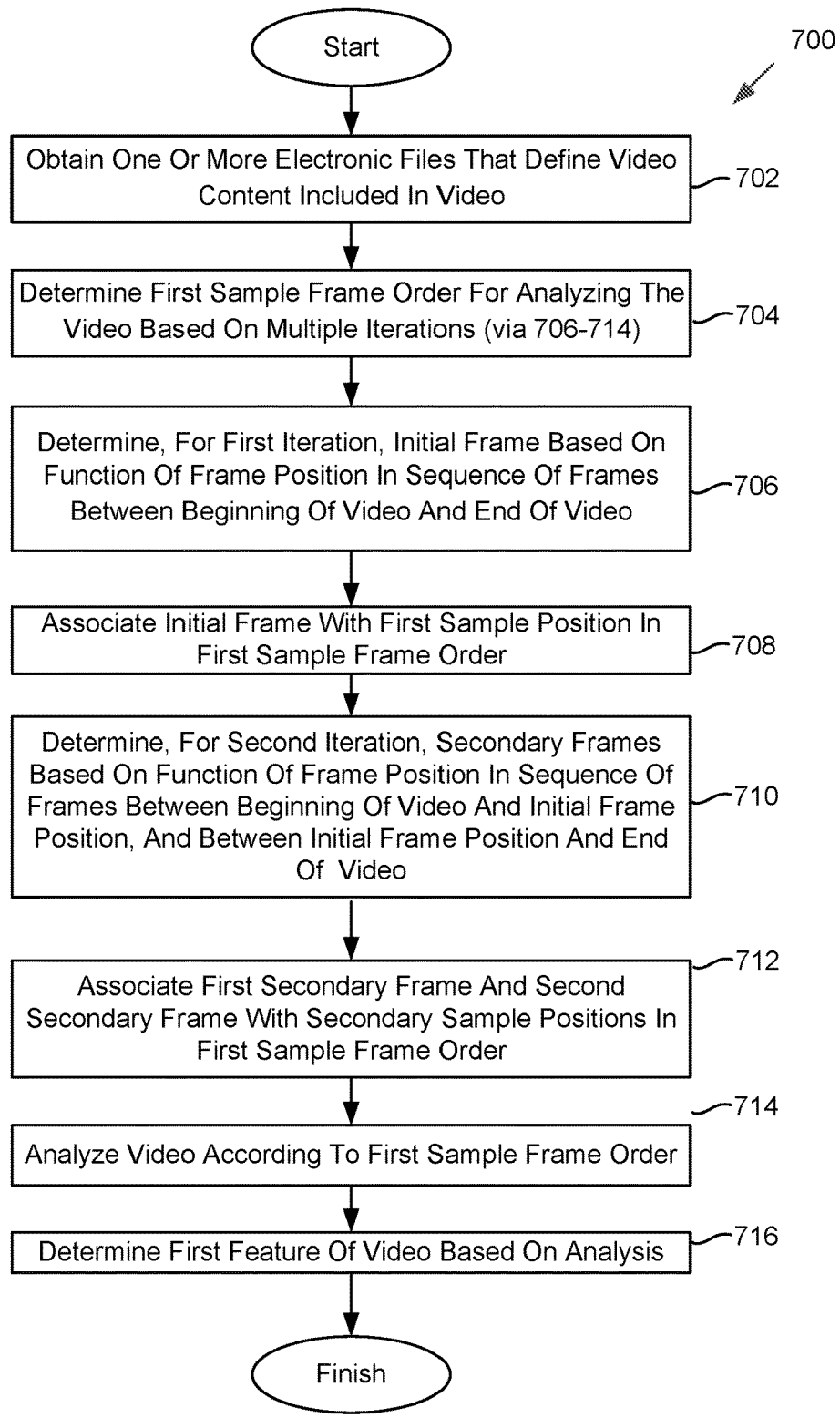
FIG. 7 illustrates a method for determining a sample frame order for analyzing a video, in accordance with one or more implementations, in accordance with one or more implementations.

FIG. 7 illustrates a method for determining a sample frame order for analyzing a video, in accordance with one or more implementations, in accordance with one or more implementations. The operations of method 700 presented below are intended to be illustrative. In some implementations, method 700 may be accomplished with one or more additional operations not described, and/or without one or more of the operations discussed. In some implementations, two or more of the operations may occur substantially simultaneously.

In some implementations, method 700 may be implemented in a computer system comprising one or more of one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information), non-transitory electronic storage storing machine-readable instructions, and/or other components. The one or more processing devices may include one or more devices executing some or all of the operations of method 700 in response to instructions stored electronically on one or more electronic storage mediums. The one or more processing devices may include one or more devices configured through hardware, firmware, and/or software to be specifically designed for execution of one or more of the operations of method 700.

Referring to FIG. 7 and method 700, at operation 702, one or more electronic files may be obtained. The one or more electronic files may define video content included in the video. The video may have multiple frames ordered in a sequence from a beginning to an end. In some implementations, operation 702 may be performed by a video component the same as or similar to video component 108 (shown in FIG. 1 and described herein).

At operation 704, a first sample frame order may be determined. The first sample frame order may be for analyzing the video. The first sample frame order may be determined based on multiple iterations. In some implementations, operation 704 may be performed by a sample frame order component the same as or similar to sample frame order component 110 (shown in FIG. 1 and described herein).

At operation 706, an initial frame may be determined. An initial frame may be determined for a first iteration. An initial frame may be determined based on a function of frame position in the sequence of frames between the beginning of the video and/or the end of the video. The initial frame may have an initial frame position in the sequence of frames. In some implementations, operation 706 may be performed by a sample frame order component the same as or similar to sample frame order component 110 (shown in FIG. 1 and described herein).

At operation 708, the initial frame may be associated with a first sample position in a first sample frame order. The first sample frame order may be is different from the sequence of frames. In some implementations, operation 708 may be performed by a sample frame order component the same as or similar to sample frame order component 110 (shown in FIG. 1 and described herein).

At operation 710, secondary frames may be determined. Secondary frames may be determined for a second iteration. Secondary frames may be determined based on a function of frame position in the sequence of frames between the beginning of the video and the initial frame position, and/or between the initial frame position and the end of the video. The secondary frames may include a first secondary frame, a second secondary frame, and/or other secondary frames. In some implementations, operation 710 may be performed by a sample frame order component the same as or similar to sample frame order component 110 (shown in FIG. 1 and described herein).

At operation 712, the first secondary frame, the second secondary frame, and/or other secondary frames may be associated with secondary sample positions in the first sample frame order. In some implementations, operation 712 may be performed by a sample frame order component the same as or similar to sample frame order component 110 (shown in FIG. 1 and described herein).

At operation 714, the video may be analyzed according to the first sample frame order. The video may be analyzed to determine one or more features of the video. In some implementations, operation 714 may be performed by an analysis component the same as or similar to analysis component 114 (shown in FIG. 1 and described herein).

At operation 716, a first feature of the video may be determined. A first feature of the video may be determined based on an analysis of the frames in the video performed on the frames in the first sample frame order. In some implementations, operation 716 may be performed by a feature component the same as or similar to feature component 116 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to determine a sample frame order for analyzing a video, the system comprising:
   one or more processors configured by machine-readable instructions to:
      obtain one or more electronic files that define video content included in the video, the video having multiple frames ordered in a sequence of frames from a beginning to an end;
      determine a first sample frame order for analyzing the video based on multiple iterations, wherein determining the first sample frame order includes:
         determining, for a first iteration, an initial frame based on a function of frame position in the sequence of frames between the beginning of the video and the end of the video, the initial frame having an initial frame position in the sequence of frames;
         associating the initial frame with a first sample position in a first sample frame order that is different from the sequence of frames;
         determining, for a second iteration, secondary frames based on a function of frame position in the sequence of frames between the beginning of the video and the initial frame position, and between the initial frame position and the end of the video, wherein the secondary frames include a first secondary frame and a second secondary frame; and associating the first secondary frame and the second secondary frame with secondary sample positions in the first sample frame order;

analyze the video according to the first sample frame order to determine one or more features of the video;

determine a first feature of the video based on an analysis of frames in the video performed on the frames in the first sample frame order;

identify one or more frames from the multiple frames based on the first feature; and output the one or more frames identified.

2. The system of claim 1, wherein the initial frame position is a midpoint, or adjacent to the midpoint, of the video such that determining the initial frame based on the function of frame position in the sequence of frames between the beginning of the video and the end of the video includes determining a frame in the sequence of frames that is at the midpoint of the video or adjacent to the midpoint of the video.

3. The system of claim 1, wherein the first secondary frame has a first secondary frame position in the sequence of frames and the second secondary frame has a second secondary frame position in the sequence of frames, wherein the first secondary frame position is located at a secondary midpoint between the beginning of the of the video and the initial frame position or adjacent to the secondary midpoint between the beginning of the of the video and the initial frame position, and the second secondary frame position is located at a secondary midpoint between the initial frame position and the end of the video or adjacent to the secondary midpoint between the initial frame position and the end of the video.

4. The system of claim 1, wherein the first feature includes one or more of a goodness score, a motion metric, a shape metric, a face metric, and/or a persistence metric.

5. The system of claim 1, wherein the multiple iterations include a quantity of iterations beyond the first iteration and the second iteration, and wherein determining the first sample frame order further includes determining, for individual ones of the quantity of iterations, other sets of frames to be associated with other sample positions in the first sample frame order based on a function of frame position in the sequence of frames between a previously determined frame determined during an immediately preceding iteration within the multiple iterations, and one of the beginning of the video, the end of the video, or another previously determined frame determined during another preceding iteration.

6. The system of claim 5, wherein the quantity of iterations indicates a depth of the sample of the video such that less than five iterations indicates a less in-depth sample of the video than five or more iterations.

7. The system of claim 1, wherein the first position in the first sample frame order represents a first depth pass of the video and the secondary positions in the first sample frame order represent a second depth pass of the video.

8. The system of claim 1, wherein the first secondary frame has a first secondary frame position in the sequence of frames and the second secondary frame has a second secondary frame position in the sequence of frames, such that determining the first sample frame order further includes:

determining, for a third iteration, tertiary frames based on a function of frame position in the sequence of frames between the beginning of the video and the first secondary frame position, the first secondary frame position and the initial frame position, the initial frame position and the second secondary frame position, and the second secondary frame position and the end of the video; and associating the tertiary frames with tertiary sample positions in the first sample frame order.

9. The system of claim 1, wherein the one or more processors are further configured by machine-readable instructions to:

determine an interval between a frame position in the sequence of frames determined for a given iteration and another frame position in the sequence of frames determined for an iteration immediately preceding the given iteration;

determine whether the interval is at least equal to or less than a threshold interval such that the video is analyzed and the first feature is determined responsive to the interval being at least equal to or less than the threshold interval.

10. The system of claim 1, wherein the secondary sample positions come after the first sample position and before any other sample positions in the first sample frame order such that the secondary fames associated with the secondary sample positions are analyzed after the initial frame associated with the first sample position and before any other frames associated with the other sample positions.

11. A method for determining a sample frame order for analyzing a video, the method being implemented in a computer system that includes one or more processors configured by machine-readable instructions, the method comprising:

obtaining one or more electronic files that define video content included in the video, the video having multiple frames ordered in a sequence of frames from a beginning to an end;

determining a first sample frame order for analyzing the video based on multiple iterations, wherein determining the first sample frame order includes:

determining, for a first iteration, an initial frame based on a function of frame position in the sequence of frames between the beginning of the video and the end of the video, the initial frame having an initial frame position in the sequence of frames;

associating the initial frame with a first sample position in a first sample frame order that is different from the sequence of frames;

determining, for a second iteration, secondary frames based on a function of frame position in the sequence of frames between the beginning of the video and the initial frame position, and between the initial frame position and the end of the video, wherein the secondary frames include a first secondary frame and a second secondary frame; and associating the first secondary frame and the second secondary frame with secondary sample positions in the first sample frame order;

analyzing the video according to the first sample frame order to determine one or more features of the video;

determining a first feature of the video based on an analysis of frames in the video performed on the frames in the first sample frame order;

identifying one or more frames from the multiple frames based on the first feature; and outputting the one or more frames identified.

12. The method of claim 11, wherein the initial frame position is a midpoint, or adjacent to the midpoint, of the video such that determining the initial frame based on the function of frame position in the sequence of frames between the beginning of the video and the end of the video includes determining a frame in the sequence of frames that is at the midpoint of the video or immediately adjacent to the midpoint of the video.

13. The method of claim 11, wherein the first secondary frame has a first secondary frame position in the sequence of frames and the second secondary frame has a second secondary frame position in the sequence of frames, wherein the first secondary frame position is located at a secondary midpoint between the beginning of the of the video and the initial frame position or adjacent to the secondary midpoint between the beginning of the of the video and the initial frame position, and the second secondary frame position is located at a secondary midpoint between the initial frame position and the end of the video or adjacent to the secondary midpoint between the initial frame position and the end of the video.

14. The method of claim 11, wherein the first feature includes one or more of a goodness score, a motion metric, a shape metric, a face metric, and/or a persistence metric.

15. The method of claim 11, wherein the multiple iterations include a quantity of iterations beyond the first iteration and the second iteration, and wherein determining the first sample frame order further includes determining, for individual ones of the quantity of iterations, other sets of frames to be associated with other sample positions in the first sample frame order based on a function of frame position in the sequence of frames between a previously determined frame determined during an immediately preceding iteration within the multiple iterations, and one of the beginning of the video, the end of the video, or another previously determined frame determined during another preceding iteration.

16. The system of claim 15, wherein the quantity of iterations indicates a depth of the sample of the video such that less than five iterations indicates a less in-depth sample of the video than five or more iterations.

17. The method of claim 11, wherein the first position in the first sample frame order represents a first depth pass of the video and the secondary positions in the first sample frame order represent a second depth pass of the video.

18. The method of claim 11, wherein the first secondary frame has a first secondary frame position in the sequence of frames and the second secondary frame has a second secondary frame position in the sequence of frames, such that determining the first sample frame order further includes:
 determining, for a third iteration, tertiary frames based on a function of frame position in the sequence of frames between the beginning of the video and the first secondary frame position, the first secondary frame position and the initial frame position, the initial frame position and the second secondary frame position, and the second secondary frame position and the end of the video; and
 associating the tertiary frames with tertiary sample positions in the first sample frame order.

19. The method of claim 11, further comprising:
 determining an interval between a frame position in the sequence of frames determined for a given iteration and another frame position in the sequence of frames determined for an iteration immediately preceding the given iteration;
 determining whether the interval is at least equal to or less than a threshold interval such that the video is analyzed and the first feature is determined responsive to the interval being at least equal to or less than the threshold interval.

20. The method of claim 11, wherein the secondary sample positions come after the first sample position and before any other sample positions in the first sample frame order such that the secondary fames associated with the secondary sample positions are analyzed after the initial frame associated with the first sample position and before any other frames associated with the other sample positions.

* * * * *